(12) United States Patent
Huang et al.

(10) Patent No.: US 11,112,506 B2
(45) Date of Patent: Sep. 7, 2021

(54) RECEIVER RF FRONT-END CIRCUIT AND METHOD OF SAME

(71) Applicant: Beken Corporation, Shanghai (CN)

(72) Inventors: Yiming Huang, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 415 days.

(21) Appl. No.: 16/377,872

(22) Filed: Apr. 8, 2019

(65) Prior Publication Data

US 2020/0301025 A1    Sep. 24, 2020

(30) Foreign Application Priority Data

Mar. 20, 2019    (CN) .......................... 201910214788.9

(51) Int. Cl.
*G01S 19/36* (2010.01)
*G01S 19/37* (2010.01)
*G01S 19/32* (2010.01)

(52) U.S. Cl.
CPC .............. *G01S 19/36* (2013.01); *G01S 19/32* (2013.01); *G01S 19/37* (2013.01)

(58) Field of Classification Search
CPC ........... G01S 19/32; G01S 19/36; G01S 19/37
See application file for complete search history.

(56) References Cited

U.S. PATENT DOCUMENTS

| 2009/0163159 A1* | 6/2009 | Ooi ......................... H03J 1/005 455/131 |
| 2011/0148479 A1* | 6/2011 | Aoki ....................... H04L 27/22 327/113 |
| 2013/0039444 A1* | 2/2013 | Porret .................... H04B 1/006 375/316 |

* cited by examiner

*Primary Examiner* — Dao L Phan
(74) *Attorney, Agent, or Firm* — Schwegman Lundberg & Woessner, P.A.

(57) ABSTRACT

An RF front-end circuit in a receiver, comprising a low noise amplifier (LNA) configured to receive an RF signal from an antenna; a frequency synthesizer and divider (FS_DIV), configured to generate a first local oscillation (LO) signal, a second LO signal, a third LO signal and a fourth LO signal; a first front-end circuit communicatively coupled to the LNA and the FS_DIV, and configured to output a first digital intermediate-frequency signal by processing the amplified RF signal and the first LO signal and a second digital intermediate-frequency signal by processing the amplified RF signal, the first and second LO signals; a second front-end circuit communicatively coupled to the LNA and the FS_DIV, and configured to output a third digital intermediate-frequency signal by processing the amplified RF signal and the third LO signal and a fourth digital intermediate-frequency signal by processing the amplified RF signal, the third and fourth LO signals.

12 Claims, 10 Drawing Sheets

RECEIVER RF FRONT-END CIRCUIT AND METHOD OF SAME

CROSS-REFERENCE TO RELATED APPLICATIONS

This application claims priority to Chinese Application number 201910214788.9 entitled "RECEIVER RF FRONT-END CIRCUIT AND METHOD OF SAME," filed on Mar. 20, 2019 by Beken Corporation, which is incorporated herein by reference.

TECHNICAL FIELD

The present application relates to a receiver's RF front-end circuit, but not exclusively, to a receiver RF front-end circuit for simultaneously receiving dual-band and dual-mode satellite navigation signal and a method of the same.

BACKGROUND

Global Navigation Satellite Systems (GNSS) can provide users with accurate location, speed, and time signals, which has developed rapidly in recent years. GNSS mainly includes the United States' Global Positioning System (GPS), China's Beidou System (BDS), Russia's GLONASS system and the EU's Galileo System (Galileo).

Due to spatial obstruction, a single GPS satellite receiver often cannot receive signals from enough satellites with good geometry, resulting in longer positioning times and poor positioning accuracy. Therefore, it may be helpful to receive GPS and GLONASS at the same time or GPS and BDS at the same time to speed up the positioning time to improve the positioning accuracy. This system is called a dual-band and dual-mode satellite receiver that receives GPS(L1+L5) and GLONASS(L1+L2) simultaneously or GPS(L1+L5) and BDS(B1+B2) simultaneously.

A RF front-end circuit is a key module in the dual-band and dual-mode satellite receiver, which has a significant impact on the performance, power consumption, and cost of the entire receiver. The RF front-end circuit of a conventional dual-band and dual-mode satellite receiver is generally composed of four independent RF receive paths, which has four times the cost and power consumption of the single-mode receiver. In addition, the four frequency synthesizers within each RF path operate at different RF frequencies and are prone to mutual interference.

SUMMARY

According to an aspect of an embodiment of the invention, a RF front-end circuit, comprising a low noise amplifier configured to receive an RF signal from an antenna; a frequency synthesizer and divider, configured to generate a first local oscillation signal, a second local oscillation signal, a third local oscillation signal and a fourth local oscillation signal; a first front-end circuit communicatively coupled to the low noise amplifier and the frequency synthesizer and divider, and configured to output a first digital intermediate frequency signal by mixing the amplified RF signal and the first local oscillation signal into a first intermediate frequency signal, filtering the first intermediate frequency signal and converting the filtered first intermediate frequency signal into the first digital intermediate frequency signal and output a second digital intermediate frequency signal by mixing the amplified RF signal, the first local oscillation signal and the second local oscillation signal into a second intermediate frequency signal, filtering the second intermediate frequency signal and converting the filtered second intermediate frequency signal into the second digital intermediate frequency signal; a second front-end circuit communicatively coupled to the low noise amplifier and the frequency synthesizer and divider, and configured to output a third digital intermediate frequency signal by mixing the amplified RF signal and the third local oscillation signal into a third intermediate frequency signal, filtering the third intermediate frequency signal and converting the filtered third intermediate frequency signal into the third digital intermediate frequency signal and output a fourth digital intermediate frequency signal by mixing the amplified RF signal, the third local oscillation signal and the fourth local oscillation signal into a fourth intermediate frequency signal, filtering the fourth intermediate frequency signal and converting the filtered fourth intermediate frequency signal into the fourth digital intermediate frequency signal.

According to another aspect of the embodiments of the invention, a method, comprising receiving, by a low noise amplifier (LNA), an RF signal from an antenna; generating, by a frequency synthesizer and divider, a first local oscillation signal, a second local oscillation signal, a third local oscillation signal and a fourth local oscillation signal; outputting, by a first front-end circuit communicatively coupled to the low noise amplifier and the frequency synthesizer and divider, a first digital intermediate frequency signal by mixing the amplified RF signal and the first local oscillation signal into a first intermediate frequency signal, filtering the first intermediate frequency signal and converting the filtered first intermediate frequency signal into the first digital intermediate frequency signal and a second digital intermediate frequency signal by mixing the amplified RF signal, the first local oscillation signal and the second local oscillation signal into a second intermediate frequency signal, filtering the second intermediate frequency signal and converting the filtered second intermediate frequency signal into the second digital intermediate frequency signal; outputting, by a second front-end circuit communicatively coupled to the low noise amplifier and the frequency synthesizer and divider, a third digital intermediate frequency signal by mixing the amplified RF signal and the third local oscillation signal into a third intermediate frequency signal, filtering the third intermediate frequency signal and converting the filtered third intermediate frequency signal into the third digital intermediate frequency signal and a fourth digital intermediate frequency signal by mixing the amplified RF signal, the third local oscillation signal and the fourth local oscillation signal into a fourth intermediate frequency signal, filtering the fourth intermediate frequency signal and converting the filtered fourth intermediate frequency signal into the fourth digital intermediate frequency signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE
ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details.

Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
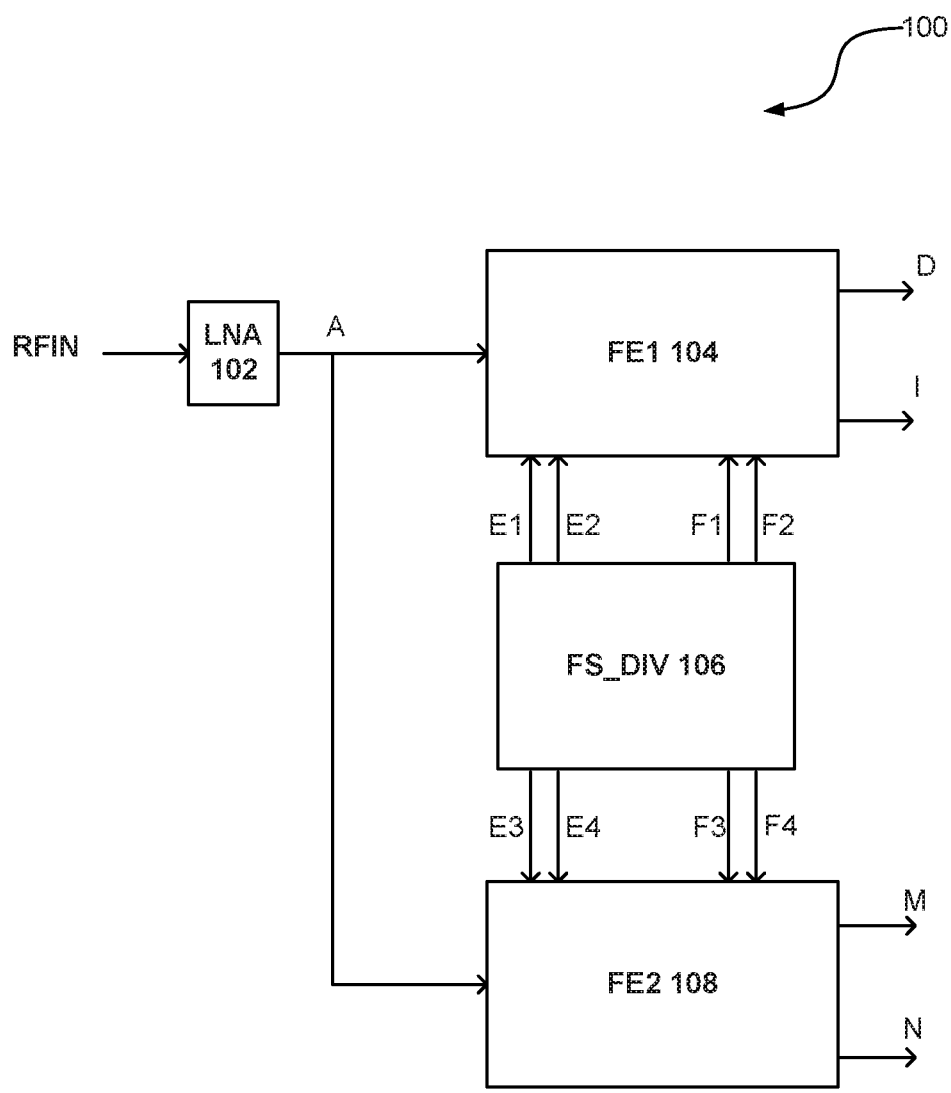
FIG. 1 is a block diagram of a receiver RF front-end circuit according to an embodiment of the invention.

FIG. 1 is a block diagram of a receiver RF front-end circuit 100 according to an embodiment of the invention. In the embodiment, the receiver RF front-end circuit 100 comprises a low noise amplifier (LNA) 102, a first front-end circuit FE1 104, a frequency synthesizer and divider (FS-DIV) 106 and a second front-end circuit FE2 108.

The LNA 102 is configured to generate an amplified RF signal A from a RF signal received from an antenna and the FS-DIV 106 is configured to generate a first local oscillation signal, a second local oscillation signal, a third local oscillation signal and a fourth local oscillation signal. Wherein, the frequency range of the RF signal A depends on the type of GNSS, for example, the frequency of the RF signal A for GPS L1 is 1575.42 MHz and for GPS L5 is 1176.45 MHz; the frequency range of the RF signal A for GLONASS L1 is 1598.0625-1609.3125 MHz and for GLONASS L2 is 1246-1256.5 MHz; and the frequency of the RF signal A for BDS B1 is 1561.098 MHz and for BDS B2 is 1207.14 MHz.

The FE1 104 is communicatively coupled to the LNA 102 and the FS-DIV 106, and configured to output a first digital intermediate frequency signal by mixing the amplified RF signal and the first local oscillation signal into a first intermediate frequency signal, filtering the first intermediate frequency signal and converting the filtered first intermediate frequency signal into the first digital intermediate frequency signal and output a second digital intermediate frequency signal by mixing the amplified RF signal, the first local oscillation signal and the second local oscillation signal into a second intermediate frequency signal, filtering the second intermediate frequency signal and converting the filtered second intermediate frequency signal into the second digital intermediate frequency signal.

The FE2 108 is communicatively coupled to the LNA 102 and the FS-DIV 106, and configured to output a third digital intermediate frequency signal by mixing the amplified RF signal and the third local oscillation signal into a third intermediate frequency signal, filtering the third intermediate frequency signal and converting the filtered third intermediate frequency signal into the third digital intermediate frequency signal and output a fourth digital intermediate frequency signal by mixing the amplified RF signal, the third local oscillation signal and the fourth local oscillation signal into a fourth intermediate frequency signal, filtering the fourth intermediate frequency signal and converting the filtered fourth intermediate frequency signal into the fourth digital intermediate frequency signal.

In an embodiment, the filtered intermediate frequency signals are navigation signals for different navigation satellite systems such as GPS, BDS and GLONASS, and then the digital intermediate frequency signals outputted by the FE1 104 or the FE2 108 are the digital satellite navigation signals.

Figure 2:
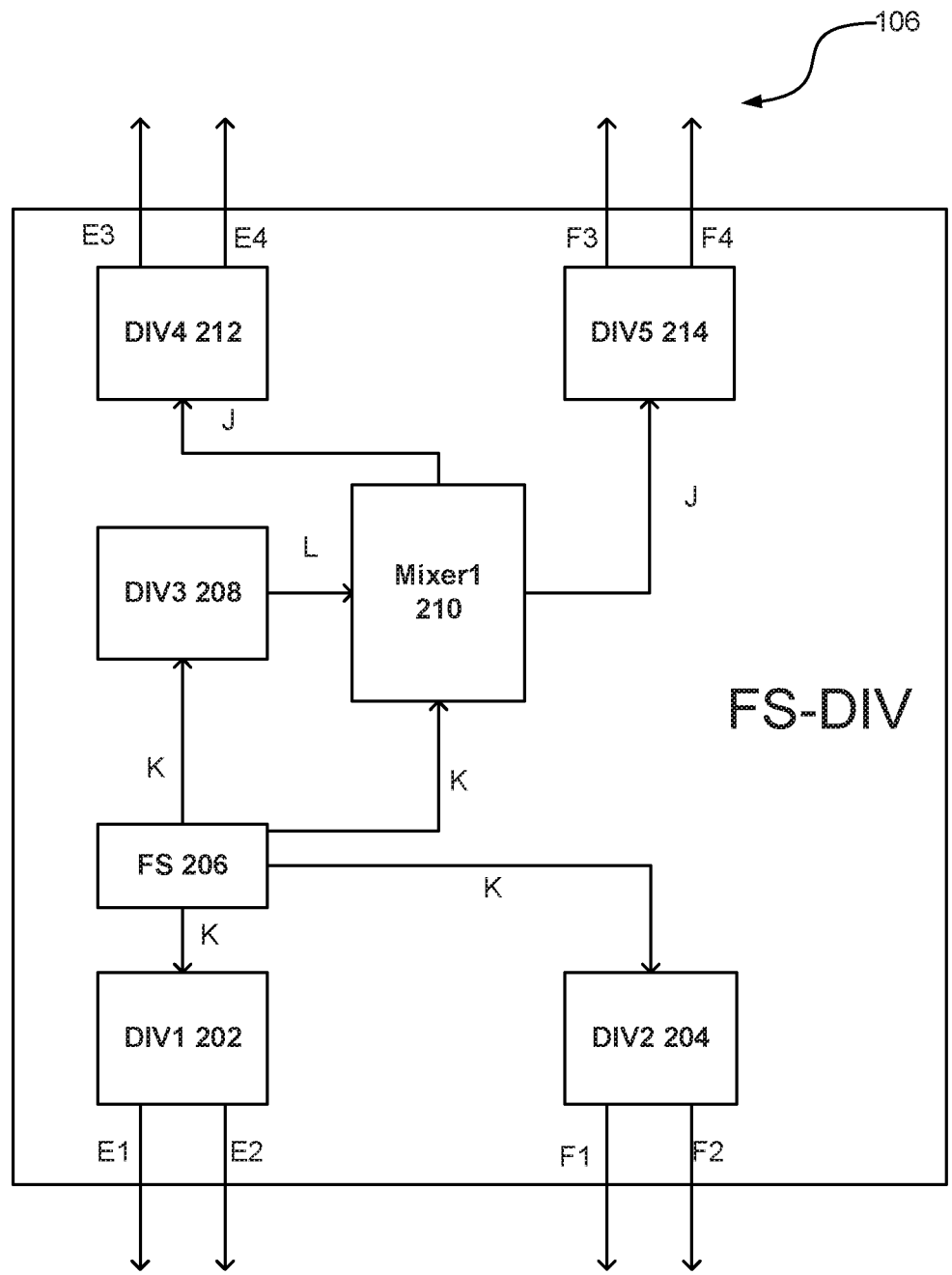
FIG. 2 is a circuit diagram of a frequency synthesizer and divider within the receiver RF front-end circuit according to an embodiment of the invention.

FIG. 2 is a circuit diagram of a frequency synthesizer and divider (FS-DIV) 106 within the receiver RF front-end circuit 100 as shown in FIG. 1 according to an embodiment of the invention. In the embodiment, the FS-DIV 106 comprises a first divider DIV1 202, a second divider DIV2 204, a frequency synthesizer (FS) 206, a third divider DIV3 208, a mixer Mixer1 210, a fourth divider DIV4 212 and a fifth divider DIV5 214.

The FS 206 is configured to generate a first signal K, wherein the frequency of the first signal K is twice the frequency of the first local oscillation signal. In the embodiment, the FS 206 then sends the first signal K to both the first divider DIV1 202 and the second divider DIV2 204, and wherein the first signal K may be a local oscillation signal at frequency $F_K$=3142.656 MHz.

The first divider DIV1 202 is communicatively coupled to the FS 206 and configured to divide the first signal K into an in-phase branch E1 of the first local oscillation signal and a quadrature branch E2 of the first local oscillation signal, wherein the frequency of the in-phase branch E1 of the first local oscillation signal and the frequency of the quadrature branch E2 of the first local oscillation signal are both equal to the half of the frequency of the first signal K. That is, the divisor of the DIV1 202 is 2, and the in-phase branch E1 and the quadrature branch E2 of the first local oscillation signal have a frequency of $F_{E1}=F_{E2}=F_K/2$=3142.656/2=1571.328 MHz. In an embodiment, the circuit can have an integer-N Phase Locked Loops (PLL), thus the local oscillation frequency of the first local oscillation signal can be 16.368*96=1571.328 MHz with 16.368 MHz crystal oscillation.

Then, the first divider DIV1 202 sends the in-phase branch E1 of the first local oscillation signal and the quadrature branch E2 of the first local oscillation signal into a first front-end circuit, for example, the FE1 104 shown in the FIG. 1 which will be described in detail below.

The second divider DIV2 204 is communicatively coupled to the FS 206 and configured to divide the first signal K into an in-phase branch F1 of the second local oscillation signal and a quadrature branch F2 of the second local oscillation signal, wherein the frequency of the in-phase branch F1 of the second local oscillation signal and the frequency of the quadrature branch F2 of the second local oscillation signal are calculated by dividing the frequency of the first signal K by a divisor of the DIV2 204.

The divisor of the DIV2 204 is configurable according to the working mode of the receiver RF front-end circuit 100.

Then, the DIV2 204 sends the in-phase branch F1 of the second local oscillation signal and the quadrature branch F2 of the second local oscillation signal into the first front-end circuit, for example, the FE1 104 shown in the FIG. 1, which will be described in detail below.

In an embodiment, the receiver RF front-end circuit 100 works for the Global Positioning System (GPS) having a satellite navigation signal GPS L1 with a frequency of 1575.42 MHz and the BeiDou Navigation Satellite (BDS) system having a satellite navigation signal BDS B1 with a frequency of 1561.098 MHz, the divisor of the second divider DIV2 204 can be chosen as 220, as a result, the in-phase branch F1 and the quadrature branch F2 of the second local oscillation signal have a frequency of $F_{E1}=F_{E2}=F_K/220=3142.656/220=14.2848$ MHz. In the embodiment, the frequency mix of the first local oscillation signal and the BDS signal (1561.098 MHz) is 10.23 MHz. For ease of demodulation, an output of the second intermediate frequency signal is less than 10 MHz, for example from 4 MHz to 6 MHz, and thus the frequency of the second local oscillation signal can be chosen as 14.2848 MHz.

In another embodiment, the receiver RF front-end circuit 100 works for the GPS having a satellite navigation signal GPS L1 with a frequency of 1575.42 MHz and the GLONASS having a satellite navigation signal GLONASS L1 with a frequency of 1602 MHz, the divisor of the second divider DIV2 204 can be chosen as 128, as a result, the in-phase branch F1 and the quadrature branch F2 of the second local oscillation signal have a frequency of $F_{E1}=F_{E2}=F_K/128=3142.656/128=24.552$ MHz. For ease of demodulation, an output of the second intermediate frequency signal is less than 10 MHz, and thus the frequency of the second local oscillation signal can be chosen as 24.552 MHz.

The third divider DIV3 208 is communicatively coupled to the FS 206 and configured to divide the first signal K and output a second signal L, wherein the frequency of the second signal L is equal to the half of the frequency of the first signal K, i.e., $F_L=F_K/2=3142.656/2=1571.328$ MHz. Then, the third divider DIV3 sends the second signal L to the first mixer 210.

The first mixer 210 is communicatively coupled to the FS 206 and the third divider DIV3 208, and configured to mix the first signal K and the second signal L into a third signal J, wherein the frequency of the third signal J is equal to the sum of the frequency of the second signal L and the frequency of the first signal K, i.e., $F_J=F_K+F_L=3142.656+1571.328=4713.984$ MHz. The first mixer 210 sends the third signal J to the fourth divider DIV4 212 and the fifth divider DIV5 214 respectively.

The fourth divider DIV4 212 is communicatively coupled to the mixer Mixer1 210 and configured to divide the third signal J into an in-phase branch E3 of the third local oscillation signal and a quadrature branch E4 of the third local oscillation signal, wherein the frequency of the in-phase branch E3 of the third local oscillation signal and the frequency of the quadrature branch E4 of the third local oscillation signal are both equal to the quarter of the frequency of the third signal J. That is, the divisor of the DIV4 212 is 4, and the in-phase branch E3 and the quadrature branch E4 of the third local oscillation signal have a frequency of $F_{E3}=F_{E4}=F_J/4=4713.984/4=1178.496$ MHz. In an embodiment, the circuit can have an integer-N Phase Locked Loops (PLL), thus the local oscillation frequency of the first local oscillation signal can be 16.368*72=1178.496 MHz with 16.368 MHz crystal oscillation.

Then, the DIV4 212 sends the in-phase branch E3 of the third local oscillation signal and the quadrature branch E4 of the third local oscillation signal into a second front-end circuit, for example, the FE2 108 shown in the FIG. 1, which will be described in detail below.

The fifth divider DIV5 214 is communicatively coupled to the first mixer 210 and configured to divide the third signal J into an in-phase branch F3 of the fourth local oscillation signal and a quadrature branch F4 of the fourth local oscillation signal, wherein the frequency of the in-phase branch F3 of the fourth local oscillation signal and the frequency of the quadrature branch F4 of the fourth local oscillation signal are calculated by dividing the frequency of the third signal by a divisor of the DIV5 214. The divisor of the DIV5 214 is configurable according to the working mode of the receiver RF front-end circuit 100.

Then, the DIV5 214 sends the in-phase branch F3 of the fourth local oscillation signal and the quadrature branch F4 of the fourth local oscillation signal into the second front-end circuit, for example, the FE2 108 shown in the FIG. 1 which will be described in detail below.

In an embodiment, the receiver RF front-end circuit 100 works for the GPS having a satellite navigation signal L5 with a frequency of 1176.45 MHz and the BDS system having a satellite navigation signal BDS B2 with a frequency of 1246 MHz, the divisor of the fifth divider DIV5 204 can be chosen as 64, as a result, the in-phase branch F3 and the quadrature branch F4 of the fourth local oscillation signal have a frequency of $F_{F3}=F_{F4}=F_J/64=4713.984/64=73.656$ MHz. For ease of demodulation, an output of the fourth intermediate frequency signal is less than 10 MHz, and thus the frequency of the fourth local oscillation signal can be chosen as 73.656 MHz.

In another embodiment, the receiver RF front-end circuit 100 works for the GPS having a satellite navigation signal GPS L5 with a frequency of 1176.45 MHz and the GLONASS having a satellite navigation signal GLONASS L2 with a frequency of 1207.14 MHz, the divisor of the fifth divider DIV5 214 can be chosen as 128, as a result, the in-phase branch F3 and the quadrature branch F4 of the fourth local oscillation signal have a frequency of $F_{F3}=F_{F4}=F_J/128=4713.984/128=36.828$ MHz. For ease of demodulation, an output of the fourth intermediate frequency signal is less than 10 MHz, and thus the frequency of the fourth local oscillation signal can be chosen as 36.828 MHz.

Figure 3:
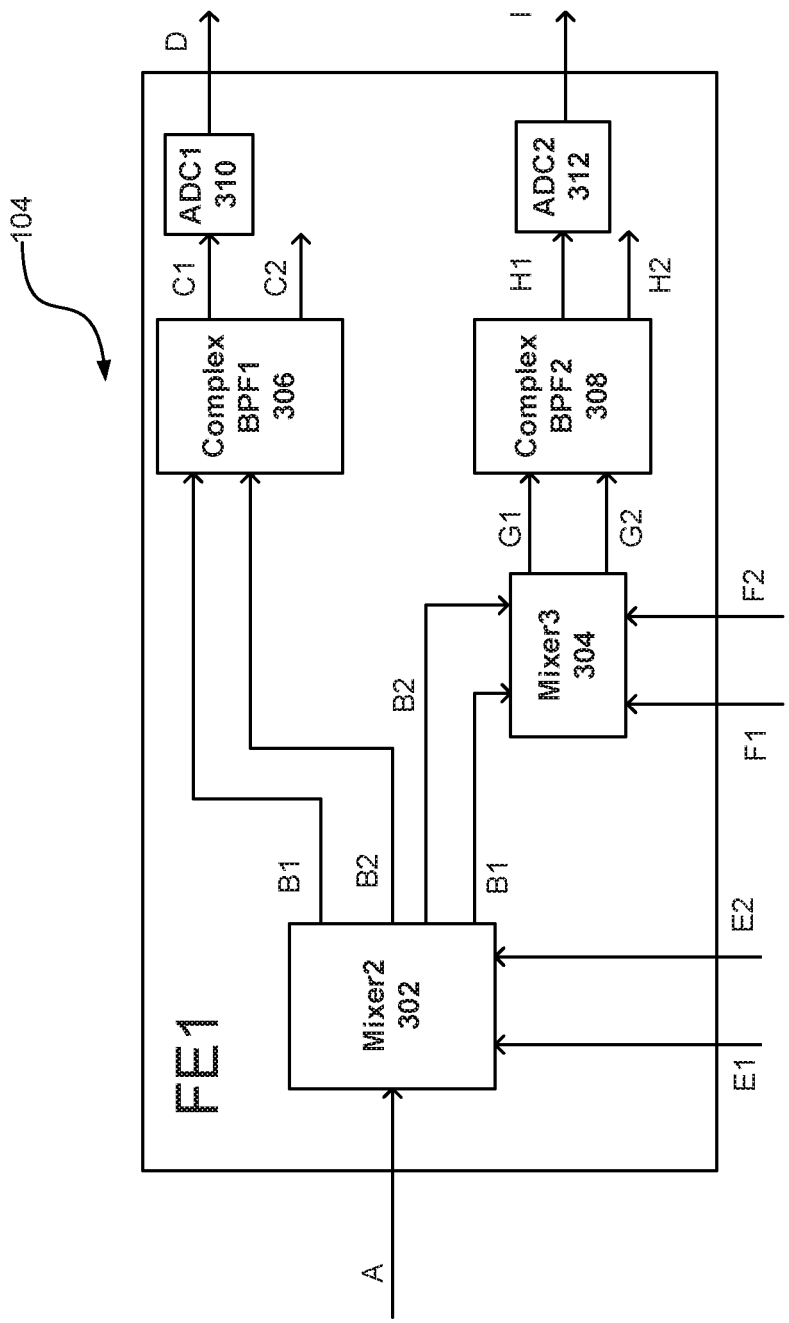
FIG. 3 is a circuit diagram of a first front-end within the receiver RF front-end circuit according to an embodiment of the invention.

FIG. 3 is a circuit diagram of a first front-end 104 within the receiver RF front-end circuit 100 as shown in FIG. 1 according to an embodiment of the invention. The first front-end circuit 104 comprises a first mixer Mixer2 302, a second mixer Mixer3 304, a first complex band path filter 306, a second complex band path filter 308, a first analog to digital converter ADC1 310 and a second analog to digital converter ADC2 312.

The Mixer2 302 is communicatively coupled to the LNA 102 (FIG. 1) and the first divider DIV1 202 (FIG. 2) and configured to mix the amplified RF signal and the in-phase branch E1 of the first local oscillation signal and the quadrature branch E2 of the first local oscillation signal to generate an in-phase branch B1 of the first intermediate frequency signal by mixing the RF signal A with the in-phase branch E1 of the first local oscillation signal and a quadrature branch B2 of the first intermediate frequency signal by mixing the RF signal A with the quadrature branch E2 of the first local oscillation signal, therefore down-converting the RF signal A to the in-phase branch B1 and quadrature branch B2 of the first intermediate frequency signal. In-phase branch B1 and quadrature branch B2 of the first intermediate frequency signal may include GPS L1 signal and BDS B1 signal, or GPS L1 signal and GLONASS L1 signal, depending on the working mode of the DIV1 202 in the FS-DIV 106.

The Mixer3 304 is communicatively coupled to the DIV2 204 (FIG. 2) and the Mixer2 302 and configured to generate an in-phase branch G1 of the second intermediate frequency signal by mixing the in-phase branch B1 of the first intermediate frequency signal with the in-phase branch F1, and a quadrature branch G2 of the second intermediate frequency signal by mixing the quadrature branch B2 of the first intermediate frequency signal with the quadrature branch F2. Similar to the in-phase branch B1 and quadrature branch B2, the in-phase branch G1 and quadrature branch G2 of the second intermediate frequency signal may include GPS L1 signal and BDS B1 signal, or GPS L1 signal and GLONASS L1 signal, depending on the working mode of the DIV2 204 in the FS-DIV 106.

The first complex band path filter 306 is communicatively coupled to the Mixer2 302 and the first analog to digital converter ADC1 310 and configured to generate an in-phase branch C1 and a quadrature branch C2 of the filtered intermediate frequency signal by filtering the in-phase branch B1 and the quadrature branch B2 to suppress signal in unwanted frequency band. For example, the first complex band path filter 306 is used to derive the GPS L1 signal and suppress the other navigation signals, such as BDS B1, BDS B2, GLONASS L1, or GLONASS L2 navigation signal, and the first complex band path filter 306 may have a pass frequency of 2.2 MHz. Therefore, the in-phase branch C1 and quadrature branch C2 only includes GPS L1.

In an embodiment, the receiver RF front-end circuit 100 works for the GPS with the signal GPS L1 and BDS system with the signal BDS L1, the frequency of the in-phase branch C1 and the quadrature branch C2 is 4.092 MHz.

In another embodiment, the receiver RF front-end circuit 100 works for the GPS with the signal GPS L1 and GLONASS with the signal GLONASS L1, the frequency of the in-phase branch C1 and a quadrature branch C2 is 4.092 MHz.

The second complex band path filter 308 is communicatively coupled to the Mixer3 304 and the second analog to digital converter ADC2 312 and configured to generate an in-phase branch H1 and a quadrature branch H2 of the second intermediate frequency signal by filtering the in-phase branch G1 and the quadrature branch G2 to suppress signal in unwanted frequency band. For example, the second complex band path filter 308 is used to derive the BDS B1 or GLONASS L1 signal and suppress the other navigation signals, such as GPS L1 navigation signal, and the second complex band path filter 308 may have a pass frequency of 11.3 MHz for GLONASS mode, or a pass frequency of 4.2 MHz for BDS mode. Therefore, the in-phase branch H1 and the quadrature branch H2 only include BDS B1 or GLONASS L1.

In an embodiment, the receiver RF front-end circuit 100 works for the GPS with the signal GPS L1 and the BDS system with the signal BDS L1, the frequency of in-phase branch H1 and a quadrature branch H2 is 4.0548 MHz.

In another embodiment, the receiver RF front-end circuit 100 works for the GPS with the signal GPS L1 and GLONASS with the signal GLONASS L1, the frequency of in-phase branch H1 and the quadrature branch H2 is 6.12 MHz.

The first analog to digital converter ADC1 310 is communicatively coupled to the first complex band path filter 306 and configured to convert the in-phase branch C1 digitally into the first digital intermediate frequency signal and output the first digital intermediate frequency signal, i.e., the first digital satellite navigation signal D.

The second analog to digital converter ADC2 312 is communicatively coupled to the second complex band path filter 308 and configured to convert the in-phase branch H1 digitally into the second digital intermediate frequency signal and output the second digital intermediate frequency signal, i.e., the second digital satellite navigation signal I.

Figure 4:
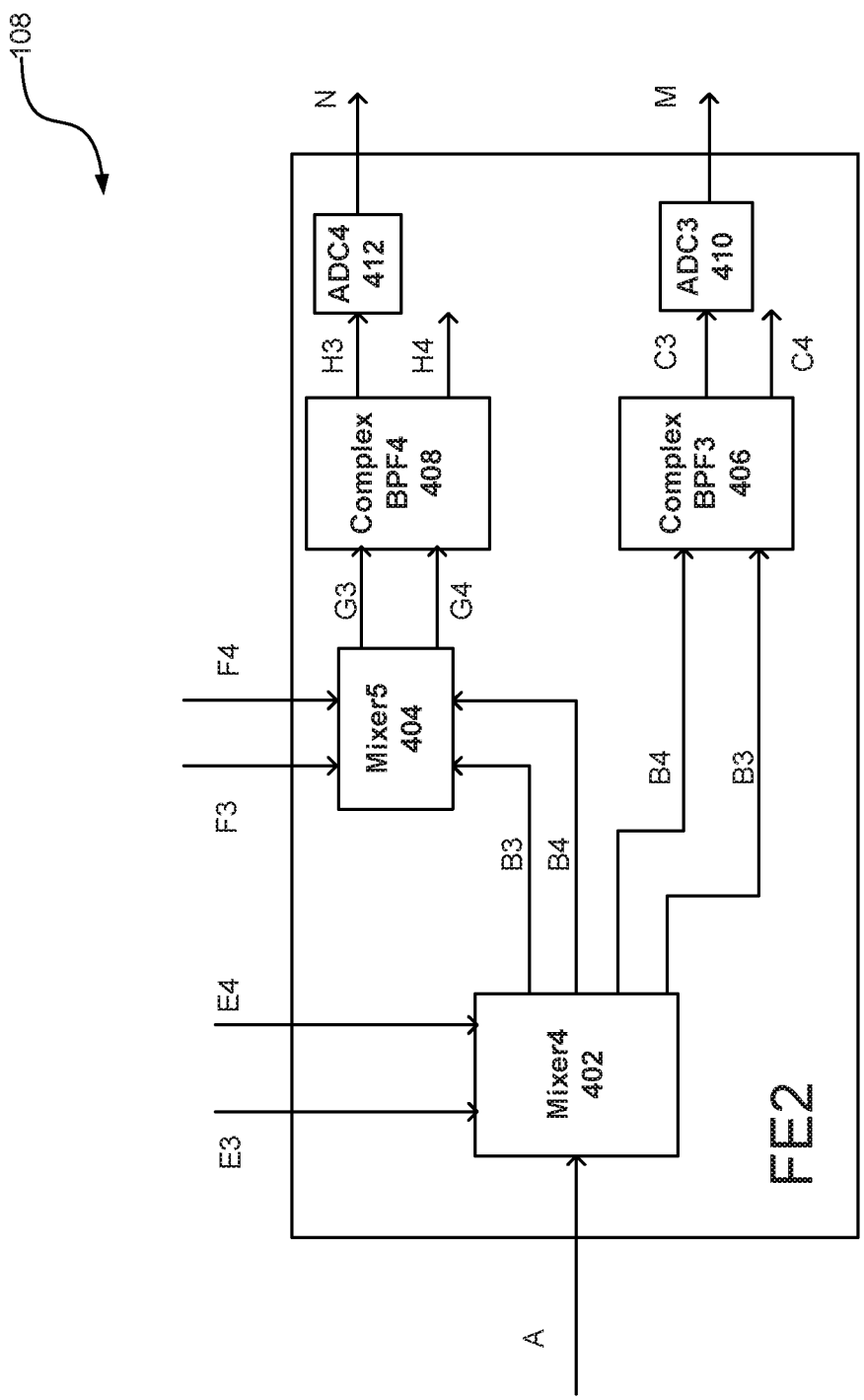
FIG. 4 is a circuit diagram of a second front-end within the receiver RF front-end circuit according to an embodiment of the invention.

FIG. 4 is a circuit diagram of a second front-end 108 within the receiver RF front-end circuit 100 as shown in FIG. 1 according to an embodiment of the invention. The second front-end circuit 108 comprises a first mixer Mixer4 402, a second mixer Mixer5 404, a first complex band path filter 406, a second complex band path filter 408, a first analog to digital converter ADC3 410 and a second analog to digital converter ADC4 412.

The Mixer4 402 is communicatively coupled to the LNA 102 (FIG. 1) and the fourth divider DIV4 212 (FIG. 2) and configured to mix the amplified RF signal and the in-phase branch E3 and the quadrature branch E4 to generate an in-phase branch B3 of the third intermediate frequency signal by mixing the RF signal A with the in-phase branch E3 and a quadrature branch B4 of the third intermediate frequency signal by mixing the RF signal A with the quadrature branch E4, therefore down-converting the RF signal A to the in-phase branch B3 and quadrature branch B4 of the third intermediate frequency signal. In-phase branch B3 and quadrature branch B4 of the third intermediate frequency signal may include GPS L5 signal and BDS B2 signal, or GPS L5 signal and GLONASS L2 signal, depending on the working mode of the DIV4 212 in the FS-DIV 106.

The Mixer5 404 is communicatively coupled to the DIV5 214 (FIG. 2) and the Mixer4 402 and configured to generate an in-phase branch G3 of the fourth intermediate frequency signal by mixing the in-phase branch B3 of the third intermediate frequency signal with the in-phase branch F3, and a quadrature branch G4 of the fourth intermediate frequency signal by mixing the quadrature branch B4 of the third intermediate frequency signal with the quadrature branch F4. Similar to the in-phase branch B3 and quadrature branch B4, the in-phase branch G3 and quadrature branch G4 of the fourth intermediate frequency signal may include GPS L5 signal and BDS B2 signal, or GPS L5 signal and GLONASS L2 signal, depending on the working mode of the DIV5 214 in the FS-DIV 106.

The first complex band path filter 406 is communicatively coupled to the Mixer4 402 and the first analog to digital converter ADC3 410 and configured to generate an in-phase branch C3 and a quadrature branch C4 of the filtered intermediate frequency signal by filtering the in-phase branch B3 and the quadrature branch B4 to suppress signal in unwanted frequency band. For example, the first complex band path filter 406 is used to derive the GPS L5 signal and suppress the other navigation signals, such as BDS B2 or GLONASS L2 navigation signal, and the first complex band path filter 406 may have a pass frequency of 2.2 MHz. Therefore, the in-phase branch C3 and quadrature branch C4 only includes GPS L5.

In an embodiment, the receiver RF front-end circuit 100 works for the GPS with the signal GPS L5 and BDS system with the signal BDS L2, the frequency of the in-phase branch C3 and a quadrature branch C4 is 2.046 MHz.

In another embodiment, the receiver RF front-end circuit 100 works for the GPS with the signal GPS L5 and GLONASS with the signal GLONASS L2, the frequency of the in-phase branch C3 and a quadrature branch C4 is 2.046 MHz.

The second complex band path filter 408 is communicatively coupled to the Mixer5 404 and the second analog to digital converter ADC4 412 and configured to generate an in-phase branch H3 and a quadrature branch H4 of the fourth intermediate frequency signal by filtering the in-phase branch G3 and the quadrature branch G4 to suppress signal in unwanted frequency band. For example, the second complex band path filter 408 is used to derive the BDS B2 or GLONASS L2 signal and suppress the other navigation signals, such as GPS L1 navigation signal, and the second complex band path filter 408 may have a pass frequency of 11.3 MHz for GLONASS mode, or a pass frequency of 4.2 MHz for BDS mode. Therefore, the in-phase branch H3 and the quadrature branch H4 only includes BDS B2 or GLONASS L2.

In an embodiment, the receiver RF front-end circuit 100 works for the GPS with the signal GPS L5 and BDS system with the signal BDS L2, the frequency of the in-phase branch H3 and the quadrature branch H4 is 6.152 MHz.

In another embodiment, the receiver RF front-end circuit 100 works for the GPS with the signal GPS L5 and GLONASS with the signal GLONASS L2, the frequency of in-phase branch H3 and a quadrature branch H4 is 8.184 MHz.

The first analog to digital converter ADC3 410 is communicatively coupled to the first complex band path filter 406 and configured to convert the in-phase branch C3 digitally into the third digital intermediate frequency signal and output the third digital intermediate frequency signal, i.e., the third digital satellite navigation signal M.

The second analog to digital converter ADC4 412 is communicatively coupled to the second complex band path filter 408 and configured to convert the in-phase branch H3 digitally into the fourth digital intermediate frequency signal and output the fourth digital intermediate frequency signal, i.e., the fourth digital satellite navigation signal N.

Note although GPS, BDS and GLONASS global navigation satellite system are used as examples, those skilled in the art can understand that other navigation satellite system including global navigation satellite system and regional navigation satellite system, such as Galileo in Europe, NAVigation with Indian Constellation (NAVIC), or Quasi-Zenith Satellite System (QZSS) in Japan, can also be used in the embodiments.

The following table 1 and table 2 show the receiver RF front-end circuit 100 works for different combination of satellite systems, for example, the combination of the GPS and the BDS system or the combination of the GPS and GLONASS.

TABLE 1

| Combination of treated signals | GPS L1 + BDS B1 | GPS L1 + GLONASS L1 | Unit |
|---|---|---|---|
| GPS L1 satellite signal frequency | 1575.42 | 1575.42 | MHz |
| BDS B1 or GLONASS L1 satellite signal frequency | 1561.098 | 1602 | MHz |
| First oscillation signal E1 and E2 frequency | 1571.328 | 1571.328 | MHz |
| Second oscillation signal F1 and F2 frequency | 14.2848 | 24.552 | MHz |

TABLE 1-continued

| Combination of treated signals | GPS L1 + BDS B1 | GPS L1 + GLONASS L1 | Unit |
|---|---|---|---|
| The filtered first intermediate frequency signal C1 and C2 frequency | 4.092 | 4.092 | MHz |
| The filtered second intermediate frequency signal H1 and H2 frequency | 4.0548 | 6.12 | MHz |

TABLE 2

| Combination of treated signals | GPS L5 + BDS B2 | GPS L5 + GLONASS L2 | Unit |
|---|---|---|---|
| GPS L5 satellite signal frequency | 1176.45 | 1176.45 | MHz |
| BDS B2 or GLONASS L2 satellite signal frequency | 1246 | 1207.14 | MHz |
| Third oscillation signal E3 and E4 frequency | 1178.496 | 1178.496 | MHz |
| Fourth oscillation signal F3 and F4 frequency | 73.656 | 36.828 | MHz |
| The filtered third intermediate frequency signal C3 and C4 frequency | 2.046 | 2.046 | MHz |
| The filtered fourth intermediate frequency signal H3 and H4 frequency | 6.152 | 8.184 | MHz |

Figure 5:
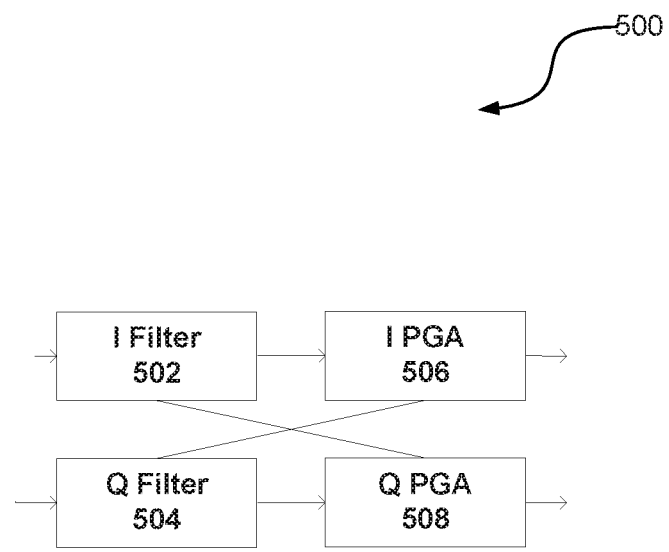
FIG. 5 is a circuit diagram of a complex band path filter within the first front-end circuit of FIG. 3 or the second front-end circuit of FIG. 4 according to an embodiment of the invention.

FIG. 5 is a circuit diagram of a complex band path filter 500 that can be used in the first front-end circuit 104 of FIG. 3 or the second front-end circuit 108 of FIG. 4 according to an embodiment of the invention. The complex band path filter 500, for example the first complex band path filter 306 and the second complex band path filter 308 in FIG. 3 and the first complex band path filter 406 and the second complex band path filter 408 in FIG. 4, comprises an in-phase branch filter 502, a quadrature branch filter 504, an in-phase branch programmable gain amplifier (I-PGA) 506 and a quadrature branch programmable gain amplifier (Q-PGA) 508.

The in-phase branch filter 502 is configured to filter an in-phase branch signal; the quadrature branch filter 504 configured to filter a quadrature branch signal; the in-phase branch programmable gain amplifier (I PGA) 506 is communicatively connected to both the in-phase branch filter 502 and the quadrature branch filter 504 and configured to generate an in-phase branch of an amplified signal based on the in-phase branch signal and the quadrature branch signal; and the quadrature branch programmable gain amplifier (Q PGA) 508 is communicatively connected to both the in-phase branch filter 502 and the quadrature branch filter 504 and configured to generate a quadrature branch of the amplified signal based on the in-phase branch signal and the quadrature branch signal.

Figure 6:
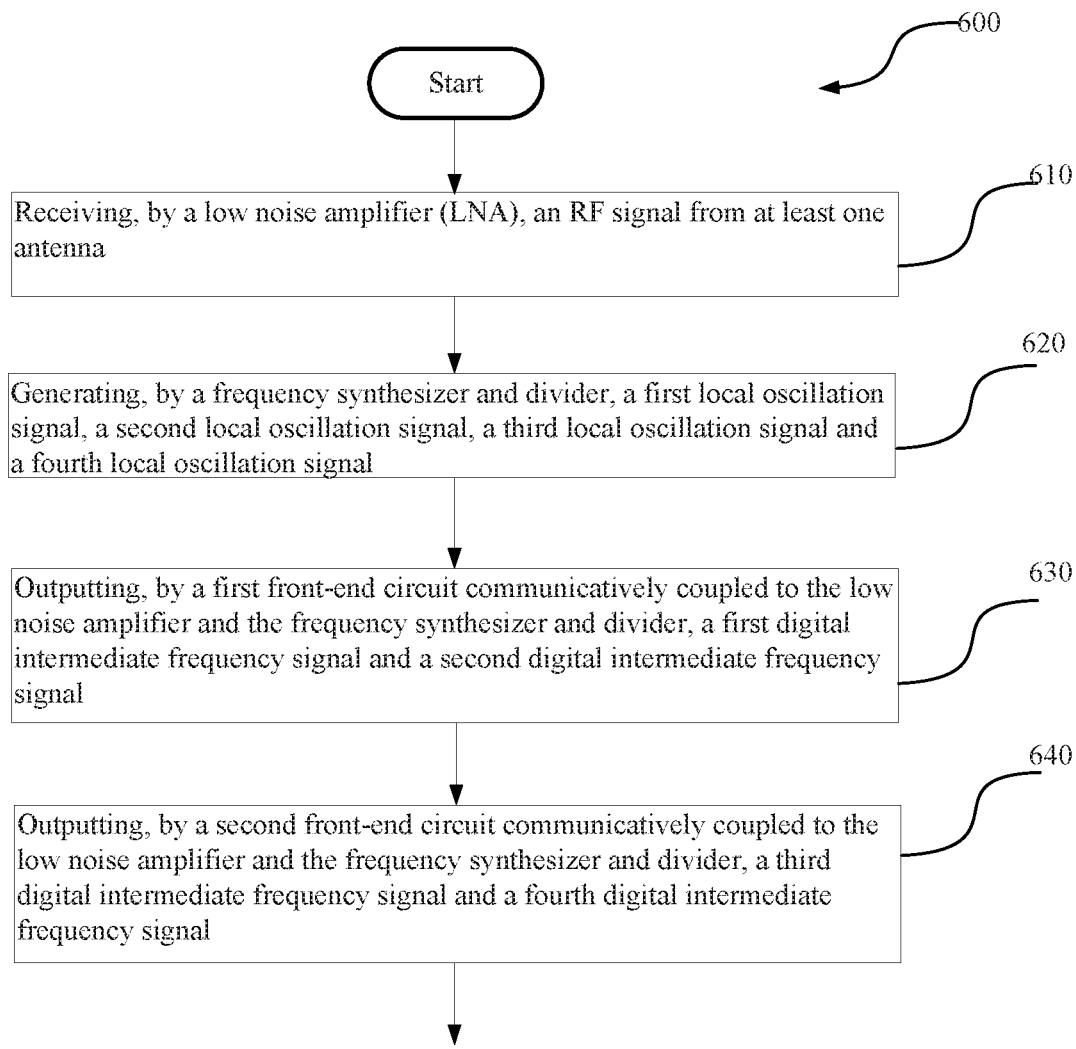
FIG. 6 is a flow chart of a method in a receiver RF front-end circuit according to an embodiment of the invention.
Figure 7:
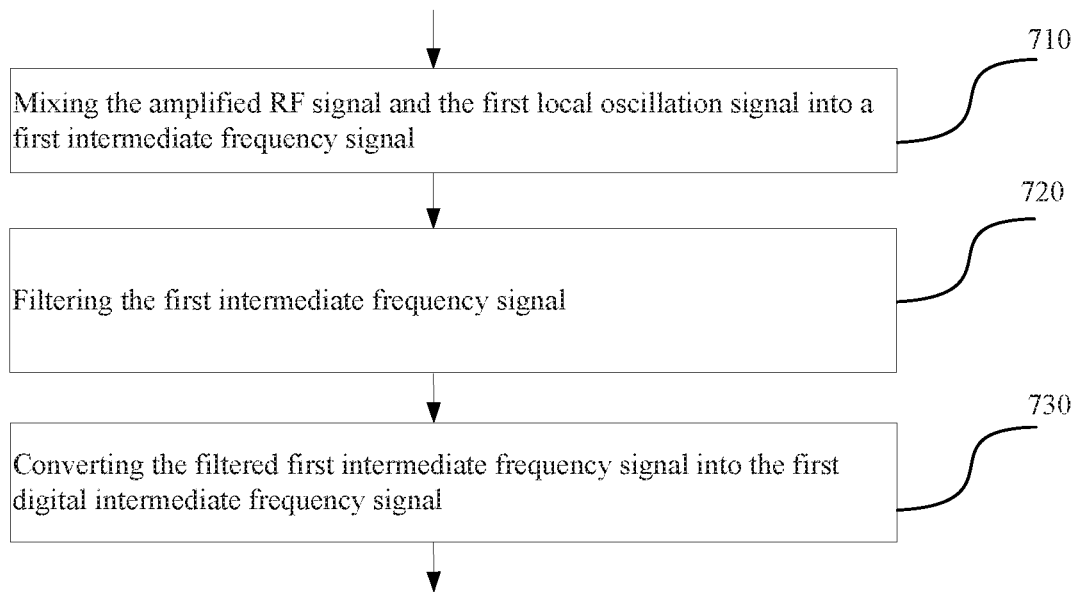
FIG. 7-FIG. 10 are continuations of the method illustrated in FIG. 6.
Figure 8:
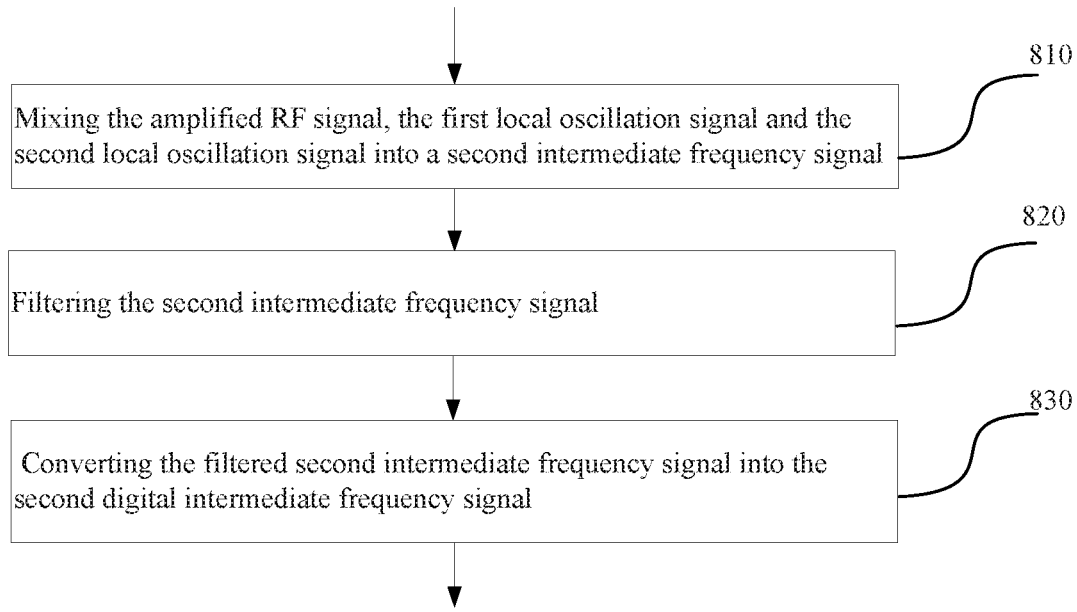
Figure 9:
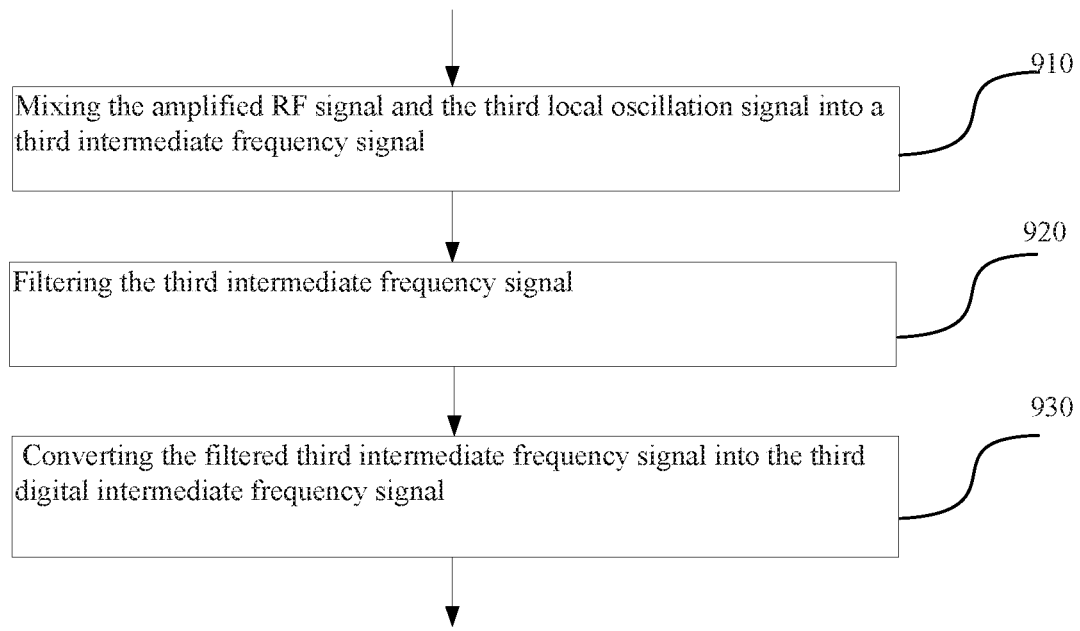
Figure 10:
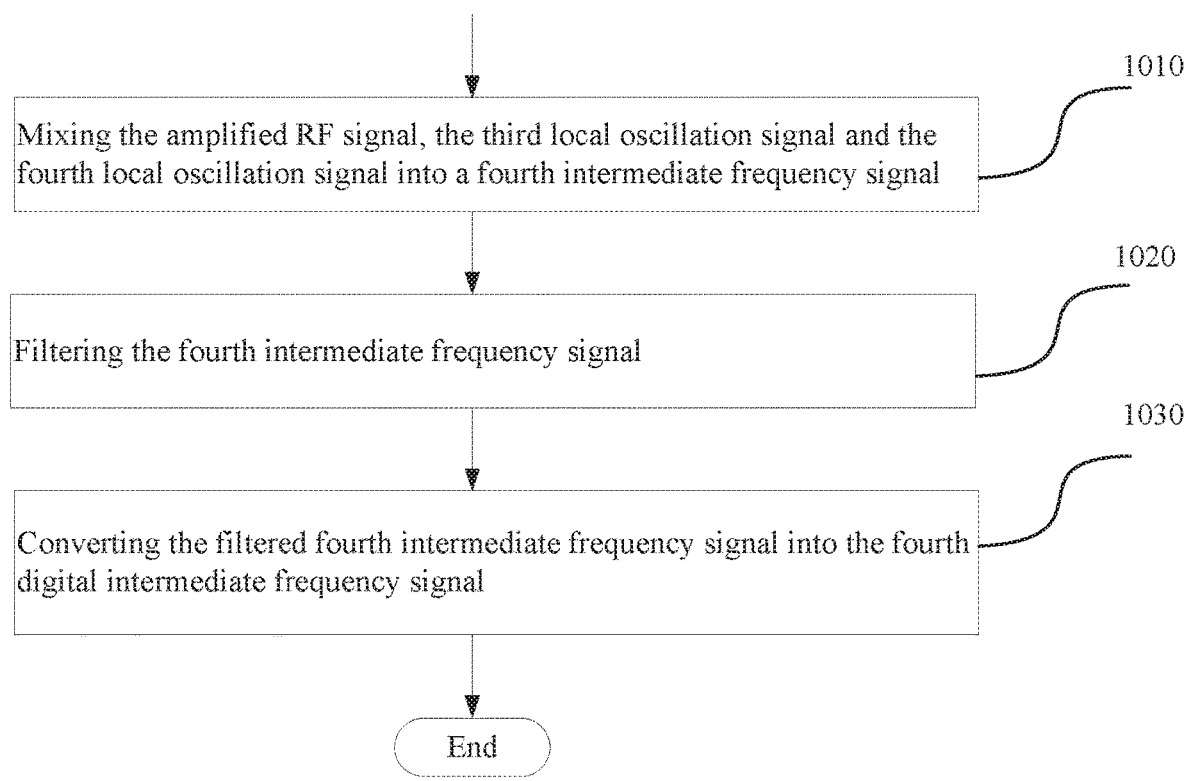

FIG. 6 is a flow chart of a method 600 in a receiver RF front-end circuit according to an embodiment of the invention. The method 600 comprises receiving, in block 610, by a low noise amplifier (LNA), a RF signal from an antenna; generating, in block 620 by a frequency synthesizer and divider, a first local oscillation signal, a second local oscillation signal, a third local oscillation signal and a fourth local oscillation signal; outputting, in block 630, by a first front-end circuit communicatively coupled to the low noise amplifier and the frequency synthesizer and divider, a first digital intermediate frequency signal and a second digital intermediate frequency signal; outputting, in block 640, by a second front-end circuit communicatively coupled to the low noise amplifier and the frequency synthesizer and divider, a third digital intermediate frequency signal and a fourth digital intermediate frequency signal.

FIG. 7-FIG. 10 are continuations of the method 600 illustrated in FIG. 6. Wherein the outputting the first digital intermediate frequency signal in block 630 is implemented by mixing, in block 710, the amplified RF signal and the first local oscillation signal into a first intermediate frequency signal, filtering, in block 720, the first intermediate frequency signal, and converting, in block 730, the filtered first intermediate frequency signal into the first digital intermediate frequency signal. And wherein the outputting the second digital intermediate frequency signal in block 630 is implemented by mixing, in block 810 the amplified RF signal, the first local oscillation signal and the second local oscillation signal into a second intermediate frequency signal, filtering, in block 820, the second intermediate frequency signal, and converting, in block 830, the filtered second intermediate frequency signal into the second digital intermediate frequency signal.

Wherein the outputting the third digital intermediate frequency signal in block 640 is implemented by mixing, in block 910, the amplified RF signal and the third local oscillation signal into a third intermediate frequency signal, filtering, in block 920, the third intermediate frequency signal, and converting, in block 930, the filtered third intermediate frequency signal into the third digital intermediate frequency signal. And wherein the outputting the fourth digital intermediate frequency signal in block 640 is implemented by mixing, in block 1010, the amplified RF signal, the third local oscillation signal and the fourth local oscillation signal into a fourth intermediate frequency signal, filtering, in block 1020, the fourth intermediate frequency signal, and converting, in block 1030, the filtered fourth intermediate frequency signal into the fourth digital intermediate frequency signal.

Alternatively, generating in block 620 is further implemented by generating, by a frequency synthesizer, a first signal, wherein the frequency of the first signal is twice the frequency of the first local oscillation signal; dividing, by a first divider communicatively coupled to the frequency synthesizer, the first signal into an in-phase branch of the first local oscillation signal and a quadrature branch of the first local oscillation signal, wherein the frequency of the in-phase branch of the first local oscillation signal and the frequency of the quadrature branch of the first local oscillation signal are both equal to the half of the frequency of the first signal; dividing, by a second divider communicatively coupled to the frequency synthesizer, the first signal into an in-phase branch of the second local oscillation signal and a quadrature branch of the second local oscillation signal, wherein the frequency of the in-phase branch of the second local oscillation signal and the frequency of the quadrature branch of the second local oscillation signal are calculated by dividing the frequency of the first signal by a divisor; dividing, by a third divider communicatively coupled to the frequency synthesizer, the first signal and outputting a second signal, wherein the frequency of the second signal is equal to the half of the frequency of the first signal; mixing, by a first mixer communicatively coupled to the frequency synthesizer and the third divider, the first signal and the second signal into a third signal, wherein the frequency of the third signal is equal to the sum of the frequency of the second signal and the frequency of the first signal; dividing, by a fourth divider communicatively coupled to the first mixer, the third signal into an in-phase branch of the third local oscillation signal and a quadrature branch of the third local oscillation signal, wherein the frequency of the in-phase branch of the third local oscillation signal and the frequency of the quadrature branch of the third local oscillation signal are both equal to the quarter of the frequency of the third signal; dividing, by a fifth divider communicatively coupled to the first mixer, the third signal into an in-phase branch of the fourth local oscillation signal and a quadrature branch of the fourth local oscillation signal, wherein the frequency of the in-phase branch of the fourth local oscillation signal and the frequency of the quadrature branch of the fourth local oscillation signal are calculated by dividing the frequency of the third signal by a divisor.

Alternatively, outputting in block 630 is further implemented by mixing, by a second mixer communicatively coupled to the low noise amplifier and the first divider, the amplified RF signal and the in-phase branch of the first local oscillation signal and the quadrature branch of the first local oscillation signal into the first intermediate frequency signal; filtering, by a first complex band path filter communicatively coupled to the second mixer, an in-phase branch of the first intermediate frequency signal and a quadrature branch of the first intermediate frequency signal to suppress signal in unwanted frequency band and outputting the first filtered intermediate frequency signal; mixing, by a third mixer communicatively coupled to the second divider and the second mixer, the in-phase branch of the first intermediate frequency signal and the quadrature branch of the first intermediate frequency signal and the in-phase branch of the second local oscillation signal and the quadrature branch of the second local oscillation signal into the second intermediate frequency signal; filtering, by a second complex band path filter communicatively coupled to the third mixer, an in-phase branch of the second intermediate frequency signal and a quadrature branch of the second intermediate frequency signal to suppress signal in unwanted frequency band and outputting the second filtered intermediate frequency signal, wherein the second filtered intermediate frequency signal is different from the first filtered intermediate frequency signal; converting, by a first analog to digital converter (ADC) communicatively coupled to the first complex band path filter, an in-phase branch of the first filtered intermediate frequency signal digitally into the first digital intermediate frequency signal and outputting the first digital intermediate frequency signal; and converting, by a second analog to digital converter (ADC) communicatively coupled to the second complex band path filter, an in-phase branch of the second filtered intermediate frequency signal digitally into the second digital intermediate frequency signal and outputting the second digital intermediate frequency signal.

Alternatively, outputting in block 640 is further implemented by mixing, by a fourth mixer communicatively coupled to the low noise amplifier and the fourth divider, the amplified RF signal and the in-phase branch of the third local oscillation signal and the quadrature branch of the third local oscillation signal into the third intermediate frequency signal; filtering, by a third complex band path filter communicatively coupled to the fourth mixer, an in-phase branch of the third intermediate frequency signal and a quadrature branch of the third intermediate frequency signal to suppress signal in unwanted frequency band and outputting the third filtered intermediate frequency signal; mixing, by a fifth mixer communicatively coupled to the fifth divider and the fourth mixer, the in-phase branch of the third intermediate frequency signal and the quadrature branch of the third intermediate frequency signal and the in-phase branch of the fourth local oscillation signal and the quadrature branch of the fourth local oscillation signal into the fourth intermediate frequency signal; filtering, by a fourth complex band path filter communicatively coupled to the fifth mixer, an in-phase branch of the fourth intermediate frequency signal and a quadrature branch of the fourth intermediate frequency signal to suppress signal in unwanted frequency band and outputting the fourth filtered intermediate frequency signal, wherein the third filtered intermediate frequency signal is different from the fourth filtered intermediate frequency signal; converting, by a third analog to digital converter (ADC) communicatively coupled to the third complex band path filter, an in-phase branch of the third filtered intermediate frequency signal digitally into the third digital intermediate frequency signal and outputting the third digital intermediate frequency signal; and converting, by a fourth analog to digital converter (ADC) communicatively coupled to the fourth complex band path filter, an in-phase branch of the fourth filtered intermediate frequency signal digitally into the fourth digital intermediate frequency signal and outputting the fourth digital intermediate frequency signal.

Alternatively, each of outputting the first filtered intermediate frequency signal, outputting the second filtered intermediate frequency signal, outputting the third filtered intermediate frequency signal and outputting the fourth filtered intermediate frequency signal is further implemented by filtering, by an in-phase branch filter, an in-phase branch signal; filtering, by a quadrature branch filter, a quadrature branch signal; amplifying, by an in-phase branch programmable gain amplifier communicatively coupled to both the in-phase branch filter and the quadrature branch filter, an in-phase branch of an amplified signal based on the in-phase branch signal and the quadrature branch signal and outputting the amplified in-phase branch of the amplified signal; and amplifying, by a quadrature branch programmable gain amplifier communicatively coupled to both the in-phase branch filter and the quadrature branch filter, a quadrature branch of the amplified signal based on the in-phase branch signal and the quadrature branch signal and outputting the amplified quadrature branch of the amplified signal.

Alternatively, the filtered intermediate frequency signals are navigation signals for different navigation satellite systems such as GPS, BDS, GLONASS, Galileo in Europe, NAVigation with Indian Constellation (NAVIC), or Quasi-Zenith Satellite System (QZSS) in Japan, and then the digital intermediate frequency signals outputted by the first front-end circuit or the second front-end circuit are the digital satellite navigation signals.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:
1. A RF front-end circuit, comprising:
   a low noise amplifier configured to receive a RF signal from an antenna;
   a frequency synthesizer and divider, configured to generate a first local oscillation signal, a second local oscillation signal, a third local oscillation signal and a fourth local oscillation signal;
   a first front-end circuit communicatively coupled to the low noise amplifier and the frequency synthesizer and divider, and configured to output a first digital intermediate frequency signal by mixing the amplified RF signal and the first local oscillation signal into a first intermediate frequency signal, filtering the first intermediate frequency signal and converting the filtered first intermediate frequency signal into the first digital intermediate frequency signal and output a second digital intermediate frequency signal by mixing the amplified RF signal, the first local oscillation signal and the second local oscillation signal into a second intermediate frequency signal, filtering the second intermediate frequency signal and converting the filtered second intermediate frequency signal into the second digital intermediate frequency signal;
   a second front-end circuit communicatively coupled to the low noise amplifier and the frequency synthesizer and divider, and configured to output a third digital intermediate frequency signal by mixing the amplified RF signal and the third local oscillation signal into a third intermediate frequency signal, filtering the third intermediate frequency signal and converting the filtered third intermediate frequency signal into the third digital intermediate frequency signal and output a fourth digital intermediate frequency signal by mixing the amplified RF signal, the third local oscillation signal and the fourth local oscillation signal into a fourth intermediate frequency signal, filtering the fourth intermediate frequency signal and converting the filtered fourth intermediate frequency signal into the fourth digital intermediate frequency signal.

2. The RF front-end circuit of claim 1, wherein the frequency synthesizer and divider comprises:
   a frequency synthesizer configured to generate a first signal, wherein the frequency of the first signal is twice the frequency of the first local oscillation signal;
   a first divider communicatively coupled to the frequency synthesizer and configured to divide the first signal into an in-phase branch of the first local oscillation signal and a quadrature branch of the first local oscillation signal, wherein the frequency of the in-phase branch of the first local oscillation signal and the frequency of the quadrature branch of the first local oscillation signal are both equal to the half of the frequency of the first signal;
   a second divider communicatively coupled to the frequency synthesizer and configured to divide the first signal into an in-phase branch of the second local oscillation signal and a quadrature branch of the second local oscillation signal, wherein the frequency of the in-phase branch of the second local oscillation signal and the frequency of the quadrature branch of the second local oscillation signal are calculated by dividing the frequency of the first signal by a divisor;
   a third divider communicatively coupled to the frequency synthesizer and configured to divide the first signal and output a second signal, wherein the frequency of the second signal is equal to the half of the frequency of the first signal;
   a first mixer communicatively coupled to the frequency synthesizer and the third divider and configured to mix the first signal and the second signal into a third signal, wherein the frequency of the third signal is equal to the sum of the frequency of the second signal and the frequency of the first signal;
a fourth divider communicatively coupled to the first mixer and configured to divide the third signal into an in-phase branch of the third local oscillation signal and a quadrature branch of the third local oscillation signal, wherein the frequency of the in-phase branch of the third local oscillation signal and the frequency of the quadrature branch of the third local oscillation signal are both equal to the quarter of the frequency of the third signal; and
a fifth divider communicatively coupled to the first mixer and configured to divide the third signal into an in-phase branch of the fourth local oscillation signal and a quadrature branch of the fourth local oscillation signal, wherein the frequency of the in-phase branch of the fourth local oscillation signal and the frequency of the quadrature branch of the fourth local oscillation signal are calculated by dividing the frequency of the third signal by a divisor.

3. The RF front-end circuit of claim 2, wherein the divisor of the second divider is configurable according to the working mode of the second divider and the divisor of the fifth divider is configurable according to the working mode of the fifth divider.

4. The RF front-end circuit of claim 3, wherein the first front-end circuit comprises:
a second mixer communicatively coupled to the low noise amplifier and the first divider and configured to mix the amplified RF signal and the in-phase branch of the first local oscillation signal and the quadrature branch of the first local oscillation signal into the first intermediate frequency signal;
a first complex band path filter communicatively coupled to the second mixer and configured to filter an in-phase branch of the first intermediate frequency signal and a quadrature branch of the first intermediate frequency signal to suppress signal in unwanted frequency band and output the first filtered intermediate frequency signal;
a third mixer communicatively coupled to the second divider and the second mixer and configured to mix the in-phase branch of the first intermediate frequency signal and the quadrature branch of the first intermediate frequency signal and the in-phase branch of the second local oscillation signal and the quadrature branch of the second local oscillation signal into the second intermediate frequency signal;
a second complex band path filter communicatively coupled to the third mixer and configured to filter an in-phase branch of the second intermediate frequency signal and a quadrature branch of the second intermediate frequency signal to suppress signal in unwanted frequency band and output the second filtered intermediate frequency signal, wherein the second filtered intermediate frequency signal is different from the first filtered intermediate frequency signal;
a first analog to digital converter (ADC) communicatively coupled to the first complex band path filter and configured to convert an in-phase branch of the first filtered intermediate frequency signal digitally into the first digital intermediate frequency signal and output the first digital intermediate frequency signal; and
a second analog to digital converter (ADC) communicatively coupled to the second complex band path filter and configured to convert an in-phase branch of the second filtered intermediate frequency signal digitally into the second digital intermediate frequency signal and output the second digital intermediate frequency signal.

5. The RF front-end circuit of claim 4, wherein the second front-end circuit comprises:
a fourth mixer communicatively coupled to the low noise amplifier and the fourth divider and configured to mix the amplified RF signal and the in-phase branch of the third local oscillation signal and the quadrature branch of the third local oscillation signal into the third intermediate frequency signal;
a third complex band path filter communicatively coupled to the fourth mixer and configured to filter an in-phase branch of the third intermediate frequency signal and a quadrature branch of the third intermediate frequency signal to suppress signal in unwanted frequency band and output the third filtered intermediate frequency signal;
a fifth mixer communicatively coupled to the fifth divider and the fourth mixer and configured to mix the in-phase branch of the third intermediate frequency signal and the quadrature branch of the third intermediate frequency signal and the in-phase branch of the fourth local oscillation signal and the quadrature branch of the fourth local oscillation signal into the fourth intermediate frequency signal;
a fourth complex band path filter communicatively coupled to the fifth mixer and configured to filter an in-phase branch of the fourth intermediate frequency signal and a quadrature branch of the fourth intermediate frequency signal to suppress signal in unwanted frequency band and output the fourth filtered intermediate frequency signal, wherein the third filtered intermediate frequency signal is different from the fourth filtered intermediate frequency signal;
a third analog to digital converter (ADC) communicatively coupled to the third complex band path filter and configured to convert an in-phase branch of the third filtered intermediate frequency signal digitally into the third digital intermediate frequency signal and output the third digital intermediate frequency signal; and
a fourth analog to digital converter (ADC) communicatively coupled to the fourth complex band path filter and configured to convert an in-phase branch of the fourth filtered intermediate frequency signal digitally into the fourth digital intermediate frequency signal and output the fourth digital intermediate frequency signal.

6. The RF front-end circuit of claim 5, wherein each of the first complex band path filter, the second complex band path filter, the third complex band path filter and the fourth complex band path filter further comprises:
an in-phase branch filter configured to filter an in-phase branch signal;
a quadrature branch filter configured to filter a quadrature branch signal;
an in-phase branch programmable gain amplifier (I-PGA) communicatively coupled to both the in-phase branch filter and the quadrature branch filter and configured to amplify an in-phase branch of an amplified signal based on the in-phase branch signal and the quadrature branch signal and output the amplified in-phase branch of the amplified signal; and
a quadrature branch programmable gain amplifier (Q-PGA) communicatively coupled to both the in-phase branch filter and the quadrature branch filter and configured to amplify a quadrature branch of the amplified signal based on the in-phase branch signal and the quadrature branch signal and output the amplified quadrature branch of the amplified signal.

7. A method, comprising:
receiving, by a low noise amplifier (LNA), a RF signal from an antenna;
generating, by a frequency synthesizer and divider, a first local oscillation signal, a second local oscillation signal, a third local oscillation signal and a fourth local oscillation signal;
outputting, by a first front-end circuit communicatively coupled to the low noise amplifier and the frequency synthesizer and divider, a first digital intermediate frequency signal and a second digital intermediate frequency signal, wherein the outputting the first digital intermediate frequency signal is implemented by
mixing the amplified RF signal and the first local oscillation signal into a first intermediate frequency signal,
filtering the first intermediate frequency signal, and
converting the filtered first intermediate frequency signal into the first digital intermediate frequency signal, and
wherein the outputting the second digital intermediate frequency signal is implemented by
mixing the amplified RF signal, the first local oscillation signal and the second local oscillation signal into a second intermediate frequency signal,
filtering the second intermediate frequency signal, and
converting the filtered second intermediate frequency signal into the second digital intermediate frequency signal; and
outputting, by a second front-end circuit communicatively coupled to the low noise amplifier and the frequency synthesizer and divider, a third digital intermediate frequency signal and a fourth digital intermediate frequency signal, wherein the outputting the third digital intermediate frequency signal is implemented by
mixing the amplified RF signal and the third local oscillation signal into a third intermediate frequency signal,
filtering the third intermediate frequency signal, and
converting the filtered third intermediate frequency signal into the third digital intermediate frequency signal, and
wherein the outputting the fourth digital intermediate frequency signal is implemented by
mixing the amplified RF signal, the third local oscillation signal and the fourth local oscillation signal into a fourth intermediate frequency signal,
filtering the fourth intermediate frequency signal, and
converting the filtered fourth intermediate frequency signal into the fourth digital intermediate frequency signal.

8. The method of claim 7, wherein generating, by the frequency synthesizer and divider, the first local oscillation signal, the second local oscillation signal, the third local oscillation signal and a fourth local oscillation signal is further implemented by:
generating, by a frequency synthesizer, a first signal, wherein the frequency of the first signal is twice the frequency of the first local oscillation signal;
dividing, by a first divider communicatively coupled to the frequency synthesizer, the first signal into an in-phase branch of the first local oscillation signal and a quadrature branch of the first local oscillation signal, wherein the frequency of the in-phase branch of the first local oscillation signal and the frequency of the quadrature branch of the first local oscillation signal are both equal to the half of the frequency of the first signal;
dividing, by a second divider communicatively coupled to the frequency synthesizer, the first signal into an in-phase branch of the second local oscillation signal and a quadrature branch of the second local oscillation signal, wherein the frequency of the in-phase branch of the second local oscillation signal and the frequency of the quadrature branch of the second local oscillation signal are calculated by dividing the frequency of the first signal by a divisor;
dividing, by a third divider communicatively coupled to the frequency synthesizer, the first signal and outputting a second signal, wherein the frequency of the second signal is equal to the half of the frequency of the first signal;
mixing, by a first mixer communicatively coupled to the frequency synthesizer and the third divider, the first signal and the second signal into a third signal, wherein the frequency of the third signal is equal to the sum of the frequency of the second signal and the frequency of the first signal;
dividing, by a fourth divider communicatively coupled to the first mixer, the third signal into an in-phase branch of the third local oscillation signal and a quadrature branch of the third local oscillation signal, wherein the frequency of the in-phase branch of the third local oscillation signal and the frequency of the in-phase branch of the third local oscillation signal are both equal to the quarter of the frequency of the third signal;
dividing, by a fifth divider communicatively coupled to the first mixer, the third signal into an in-phase branch of the fourth local oscillation signal and a quadrature branch of the fourth local oscillation signal, wherein the frequency of the in-phase branch of the fourth local oscillation signal and the frequency of the in-phase branch of the fourth local oscillation signal are calculated by dividing the frequency of the third signal by a divisor.

9. The method of claim 8, wherein the divisor of the second divider is configurable according to the working mode of the second divider and the divisor of the fifth divider is configurable according to the working mode of the fifth divider.

10. The method of claim 9, wherein outputting the first digital intermediate frequency signal and the second digital intermediate frequency signal is implemented by:
mixing, by a second mixer communicatively coupled to the low noise amplifier and the first divider, the amplified RF signal and the in-phase branch of the first local oscillation signal and the quadrature branch of the first local oscillation signal into the first intermediate frequency signal;
filtering, by a first complex band path filter communicatively coupled to the second mixer, an in-phase branch of the first intermediate frequency signal and a quadrature branch of the first intermediate frequency signal to suppress signal in unwanted frequency band and outputting the first filtered intermediate frequency signal;
mixing, by a third mixer communicatively coupled to the second divider and the second mixer, the in-phase branch of the first intermediate frequency signal and the quadrature branch of the first intermediate frequency signal and the in-phase branch of the second local oscillation signal and the quadrature branch of the second local oscillation signal into the second intermediate frequency signal;

filtering, by a second complex band path filter communicatively coupled to the third mixer, an in-phase branch of the second intermediate frequency signal and a quadrature branch of the second intermediate frequency signal to suppress signal in unwanted frequency band and outputting the second filtered intermediate frequency signal, wherein the second filtered intermediate frequency signal is different from the first filtered intermediate frequency signal;

converting, by a first analog to digital converter (ADC) communicatively coupled to the first complex band path filter, an in-phase branch of the first filtered intermediate frequency signal digitally into the first digital intermediate frequency signal and outputting the first digital intermediate frequency signal; and converting, by a second analog to digital converter (ADC) communicatively coupled to the second complex band path filter, an in-phase branch of the second filtered intermediate frequency signal digitally into the second digital intermediate frequency signal and outputting the second digital intermediate frequency signal.

11. The method of claim 10, wherein outputting the third digital intermediate frequency signal and the fourth digital intermediate frequency signal is implemented by:

mixing, by a fourth mixer communicatively coupled to the low noise amplifier and the fourth divider, the amplified RF signal and the in-phase branch of the third local oscillation signal and the quadrature branch of the third local oscillation signal into the third intermediate frequency signal;

filtering, by a third complex band path filter communicatively coupled to the fourth mixer, an in-phase branch of the third intermediate frequency signal and a quadrature branch of the third intermediate frequency signal to suppress signal in unwanted frequency band and outputting the third filtered intermediate frequency signal;

mixing, by a fifth mixer communicatively coupled to the fifth divider and the fourth mixer, the in-phase branch of the third intermediate frequency signal and the quadrature branch of the third intermediate frequency signal and the in-phase branch of the fourth local oscillation signal and the quadrature branch of the fourth local oscillation signal into the fourth intermediate frequency signal;

filtering, by a fourth complex band path filter communicatively coupled to the fifth mixer, an in-phase branch of the fourth intermediate frequency signal and a quadrature branch of the fourth intermediate frequency signal to suppress signal in unwanted frequency band and outputting the fourth filtered intermediate frequency signal, wherein the third filtered intermediate frequency signal is different from the fourth filtered intermediate frequency signal;

converting, by a third analog to digital converter (ADC) communicatively coupled to the third complex band path filter, an in-phase branch of the third filtered intermediate frequency signal digitally into the third digital intermediate frequency signal and outputting the third digital intermediate frequency signal; and converting, by a fourth analog to digital converter (ADC) communicatively coupled to the fourth complex band path filter, an in-phase branch of the fourth filtered intermediate frequency signal digitally into the fourth digital intermediate frequency signal and outputting the fourth digital intermediate frequency signal.

12. The method of claim 11, wherein each of outputting the first filtered intermediate frequency signal, outputting the second filtered intermediate frequency signal, outputting the third filtered intermediate frequency signal and outputting the fourth filtered intermediate frequency signal is further implemented by:

filtering, by an in-phase branch filter, an in-phase branch signal;

filtering, by a quadrature branch filter, a quadrature branch signal;

amplifying, by an in-phase branch programmable gain amplifier communicatively coupled to both the in-phase branch filter and the quadrature branch filter, an in-phase branch of an amplified signal based on the in-phase branch signal and the quadrature branch signal and outputting the amplified in-phase branch of the amplified signal; and amplifying, by a quadrature branch programmable gain amplifier communicatively coupled to both the in-phase branch filter and the quadrature branch filter, a quadrature branch of the amplified signal based on the in-phase branch signal and the quadrature branch signal and outputting the amplified quadrature branch of the amplified signal.

* * * * *